2,979,512
PYRAZOLE DERIVATIVES

Derek Ernest Wright, Seven Kings, Ilford, England, assignor to May & Baker Limited, Dagenham, England, a company of Great Britain No Drawing. Filed Nov. 27, 1959, Ser. No. 855,518

Claims priority, application Great Britain Dec. 3, 1958

4 Claims. (Cl. 260—310)

This invention provides new pyrazole derivatives of therapeutic utility, processes for their preparation and pharmaceutical compositions containing them.

The new pyrazoles of the present invention are the di-pyrazolylalkanes and related compounds of the general formula:

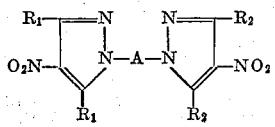
I wherein $R_1$ and $R_2$ are the same or different and each represents a hydrogen atom or a lower alkyl group, and A represents either an aliphatic hydrocarbon chain containing 1 to 12 carbon atoms which may be saturated or unsaturated and which may be substituted by one or more lower alkyl or hydroxyl groups, or a diacyl group of the formula —CO—$(CH_2)_n$—CO— (where $n$ is an integer from 1 to 12 inclusive), or an ether group of the formula —$(CH_2)_x$—O—$(CH_2)_y$— (where $x$ and $y$ are the same or different integers from 1 to 10 inclusive), or a divalent cycloalkyl group (such as 1,4-cyclohexylene). The term "lower alkyl" is used herein to denote alkyl groups containing not more than four carbon atoms.

These new compounds show useful activity as antiprotozoal agents, especially in the treatment of trichomoniasis (e.g. that caused by *T. vaginalis*). The preferred compounds are those of general Formula I where $R_1$ and $R_2$ represent hydrogen atoms and A represents the group —$(CH_2)_m$— (where $m$ is an integer from 2 to 7 inclusive). Of outstanding activity and low toxicity are 1,7-di-(4-nitropyrazol-1-yl)-n-heptane and 1,5-di-(4-nitropyrazol-1-yl)-n-pentane.

According to a feature of the invention, the new compounds of general Formula I are prepared by a process which comprises reacting a nitropyrazole of the general formula:

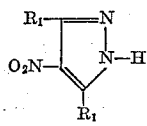
II with a compound of the general formula:

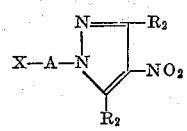
III where $R_1$, $R_2$ and A are as hereinbefore defined and X represents a reactive ester residue such as a halogen atom or a sulphuric or sulphonic ester residue.

The starting materials of Formula III may be prepared by condensing a nitropyrazole of the formula:

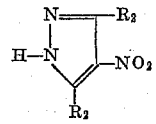
IV with a compound of the formula:

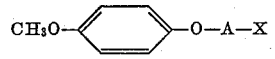
V followed by fission of the condensation product with hydrogen bromide or iodide. Preferably, the initial condensation is carried out by heating the reactants in an inert solvent and the subsequent fission is carried out with hydrogen bromide in acetic acid at about 100° C.

According to a further feature of the invention, the new compounds of general Formula I, where $R_1$ and $R_2$ are identical, are prepared by a process which comprises reacting a nitropyrazole of Formula II with a compound of the general formula:

X—A—X      VI where X, $R_1$ and A are as hereinbefore defined.

These two preparative methods are preferably carried out by heating the reactants in an inert solvent such as an alcohol, acetone or a benzene hydrocarbon in the presence of an acid binding agent such as the alkali metals and their derivatives, including carbonates, alkoxides, amides and hydrides, or a tertiary base such as quinoline. In an alternative method, the pyrazole derivative of Formula II is first converted into an alkali metal derivative thereof, for example by reaction with an alkali metal alkoxide, and this alkali metal derivative is subsequently reacted with the compound of Formula III or VI as the case may be.

According to yet a further feature of the invention, the new compounds of general Formula I are prepared by nitrating a compound of the general formula:

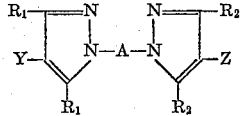
VII (where one of Y and Z represents a hydrogen atom and the other a hydrogen atom or a nitro group, and $R_1$, $R_2$ and A are as hereinbefore defined) by known methods for the nitration of pyrazoles, using, for example, a mixture of concentrated nitric and sulphuric acids.

The compounds of general Formula VII may be prepared by either of the first two methods disclosed above for preparing the compounds of general Formula I using appropriate un-nitrated starting materials.

The following examples illustrate the invention.

Example I 4-nitropyrazole (22 g.) was dissolved in 2-ethoxyethanol (220 ml.), and to the solution was added anhydrous potassium carbonate (14 g.) and ethylene dibromide (8.5 ml.). The mixture was stirred and heated at 100° C. for 24 hours. After cooling in ice the crystalline solid was filtered off, washed by grinding to a paste with water and refiltering, and dried at 100° C. Recrystallisation from nitromethane (40 ml.) gave 1,2-di-(4-nitropyrazol-1-yl)ethane as pale yellow prisms, M.P. 189–190° C.

The following compounds were similarly prepared from 4-nitropyrazole by reaction with the appropriate dihalide:

1,5-di-(4-nitropyrazol-1-yl)-n-pentane, M.P. 97–99° C. (after recrystallisation from methanol)

1,1-di-(4-nitropyrazol-1-yl)-methane, M.P. 164–165° C. (after recrystallisation from ethanol)

1,3-di-(4-nitropyrazol-1-yl)propane, M.P. 149–151° C. (after recrystallisation from nitromethane)

1,4-di-(4-nitropyrazol-1-yl)-n-butane, M.P. 162–164° C. (after recrystallisation from nitromethane)

1,6-di-(4-nitropyrazol-1-yl)-n-hexane, M.P. 114–115° C. (after recrystallisation from ethanol)

1,7-di-(4-nitropyrazol-1-yl)-n-heptane, M.P. 67–69° C. (after recrystallisation from methanol)

1,5 - di - (4 - nitropyrazol - 1 - yl) - 3 - methyl - n - pentane, M.P. 106–108° C. (after recrystallisation from benzene)

1,4-di-(4-nitropyrazol-1-yl)-but-2-ene, M.P. 169–171° C. (after recrystallisation from ethanol)

1,8-di-(4-nitropyrazol-1-yl)-n-octane, M.P. 74–75° C. (after recrystallisation from ethanol)

*Example II*

4-nitropyrazole (2.2 g.) was dissolved in 2-ethoxyethanol (20 ml.) and to the solution was added anhydrous potassium carbonate (1.4 g.) and octamethylene dibromide (2.7 g.). The mixture was stirred and heated at 100° C. for 20 hours, cooled in ice and added to water (100 ml.). The resulting oily suspension, which slowly crystallised on scratching, was made just alkaline to phenolphthalein with 2 N sodium hydroxide and refrigerated overnight. The now crisp solid was collected, washed with water and ethanol and dried at 35° C. Recrystallisation from ethanol (15 ml.) gave 1,8-di-(4-nitropyrazol-1-yl)-n-octane as pale green prisms, M.P., 72–73° C.

The following compounds were similarly prepared from 4-nitropyrazole with the appropriate dihalide:

1,9-di-(4-nitropyrazol-1-yl)-n-nonane, M.P. 59–60° C. (after recrystallisation from ethanol)

trans-1,4-di-(4-nitropyrazol-1-yl)cyclohexane, M.P. 267–269° C. (after recrystallisation from nitromethane)

1,3-di-(4-nitropyrazol-1-yl)-2-hydroxypropane, M.P. 142–144° C. (after recrystallisation from ethanol)

2,2′-di-(4-nitropyrazol-1-yl)-diethyl ether, M.P. 132–134° C. (after recrystallisation from ethanol)

*Example III*

3,5-dimethyl-4-nitropyrazole (21.2 g.) was dissolved in 2-ethoxy-ethanol (120 ml.) and to the solution was added anhydrous potassium carbonate (8.4 g.) followed by nonamethylene dibromide (17.2 g.). The mixture was stirred and heated at 100° C. for 22 hours and then cooled in ice. The crystalline solid was filtered off, washed by grinding to a paste with water and refiltering, and dried at 60° C. Recrystallisation from ethanol (80 ml.) gave 1,9-di-(3,5-dimethyl-4-nitropyrazol-1-yl)-n-nonane as colourless needles, M.P. 100–102° C.

The following compounds were prepared from 3,5-dimethyl-4-nitropyrazole by reaction with the appropriate dihalide:

1,2 - di - 3,5 - dimethyl - 4 - nitropyrazol - 1 - yl)ethane, M.P. 195–196° C. (after recrystallisation from ethanol)

1,5 - di - (3,5 - dimethyl - 4 - nitropyrazol - 1 - yl) - n-pentane, M.P. 164–165° C. (after recrystallisation from nitromethane)

1,9-di-(3,5-dimethyl-4-nitropyrazol-1-yl)-n-nonane, M.P. 100–102° C. (after recrystallisation from ethanol)

1,5-di-(3,5-diethyl-4-nitropyrazol-1-yl)-n-pentane, M.P. 84–85° C. (after recrystallisation from aqueous ethanol)

*Example IV*

3,5-dimethyl-4-nitropyrazole (35 g.) was dissolved in dry acetone (250 ml.) and to the solution was added anhydrous sodium carbonate (13.2 g.), followed by succinyl chloride (18.6 g.) added dropwise with stirring and cooling in ice, keeping the reaction temperature at 20° C. throughout. The mixture was then stirred at room temperature for 20 hours, added to water (1.25 l.) and the suspension made just alkaline to phenolphthalein with 2 N sodium hydroxide. The solid was filtered off, washed with water and dried in vacuo over silica gel. Recrystallisation from ethyl acetate (525 ml.) gave succinyl-N,N′ - bis(3,5 - dimethyl - 4 - nitropyrazole) as colourless prisms, M.P. 182–184° C.

Similarly prepared was:

Succinyl-N,N′-bis(4-nitropyrazole), M.P. 194–196° C. (after recrystallisation from nitromethane)

*Example V*

To a solution of sodium (3.4 g.) in dry ethanol (50 ml.) was added pyrazole (10 g.) and the resulting solution evaporated to dryness in vacuo. The sodio-derivative thus obtained was suspended in dry toluene (50 ml.), 1,5-dibromopentane (10 ml.) was added, and the mixture stirred and heated at 100° C. for 18 hours. The mixture was cooled, filtered and the filtrate evaporated to dryness. The residual oil was distilled to give 1,5-di-(pyrazol-1-yl)-n-pentane (80 g., 82%) as a colourless liquid, B.P. 120–121° C./0.15 mm., $n_D^{20}$ 1.5208. Its dipicrolonate forms prisms (from ethanol), M.P. 136–138° C. (decomp.).

To a solution of 1,5-di-(pyrazol-1-yl)-n-pentane (1.0 g.) in concentrated sulphuric acid (10 ml.) was added dropwise, with cooling and stirring, a mixture of concentrated nitric acid (6 ml.) and concentrated sulphuric acid (6 ml.), the reaction temperature being maintained at 15° C. throughout. The resulting solution was heated at 100° C. for 30 minutes, cooled, and added to ice-water (100 ml.). The colourless solid which separated was collected, washed with water, and dried at 60° C. to give 1,5-di-(4-nitropyrazol-1-yl)-n-pentane (1.3 g., 90%), M.P. 95–97° C., identical with the material prepared as described in Example I.

*Example VI*

4-nitropyrazole (2.3 g.) was mixed with anhydrous potassium carbonate (1.4 g.), 2-ethoxyethanol (20 ml.) and p-methoxyphenoxypentyl iodide (6.4 g.), and heated at 100° C. with stirring for 3 hours. The resulting suspension was added to water (125 ml.), and the oil which precipitated rapidly crystallised. The solid (5.8 g.) was filtered off, washed with water and dried at 50° C.; it had M.P. 74–77° C. Recrystallisation from ethanol (30 ml.) gave 1-(4-methoxyphenoxy) - 5 - (4-nitro-pyrazol-1-yl)pentane as colourless prisms (4.9 g.), M.P. 77–78° C.

The above compound (3.0 g.) was added to glacial acetic acid (110 ml.) and saturated with gaseous hydrogen bromide at room temperature. The resulting solution was heated at 100° C. for 3 hours while a slow stream of hydrogen bromide was passed into the reaction mixture. The resulting yellow solution was evaporated to dryness, the residue was dissolved in ether, washed twice with 2 N sodium hydroxide and twice with water, dried and evaporated to dryness giving 1-(5-bromopentyl)-4-nitropyrazole as an oil which was sufficiently pure for the next stage. It was characterised by reaction with thiourea to give the S-[5-(4-nitropyrazol-1-yl)pentyl]isothiourea, isolated as its picrate, M.P. 185–188° C. (after crystallisation from ethanol).

4-nitropyrazole (1.13 g.) was dissolved in 2-ethoxyethanol (20 ml.) and to the solution was added anhydrous potassium carbonate (0.7 g.) and 1-(5-bromopentyl)-4-nitropyrazole (2.6 g.) prepared as described above). Proceeding as described in Example I, 1,5-di-(4-nitropyrazol-1-yl)-n-pentane was obtained as pale yellow prisms, M.P. 98–99° C. (after crystallisation from methanol), identical with the material obtained in Example I.

*Example VII*

1-(4-nitropyrazol-1-yl)-5-(pyrazol-1-yl)-n-pentane was prepared from 1-(5-bromopentyl)-4-nitropyrazole (prepared as described in Example VI) and pyrazole, using the method described in Example V. It was obtained as a colourless oil, characterised as picrate, M.P. 134–135° C.

The foregoing compound was nitrated according to the conditions described in Example V, giving 1,5-(4-nitropyrazol-1-yl)-n-pentane as a colourless solid, M.P. 96–98° C., identical with the material obtained in Example I.

The present invention includes within its scope pharmaceutical compositions which comprise one or more compounds of general Formula I together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid composition, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously general unit dosage forms may be administered at about the same time. In general, the preparations of the present invention should normally contain at least 0.025% by weight of active substance in the case of injectable solutions and at least 0.1% by weight of such substance in the case of oral preparations.

The following example will serve to illustrate pharmaceutical compositions according to the invention.

*Example VIII*

Tablets were prepared of the formula:

| | Percent |
|---|---|
| 1,5-di-(4-nitropyrazol-1-yl)-n-pentane | 78.4 |
| Starch | 14.2 |
| Dextrin | 5.5 |
| Sodium carboxymethylcellulose | 0.88 |
| Stearic acid | 0.6 |
| Magnesium stearate | 0.42 |

(wherein the percentages are by weight)

Similarly may be prepared pharmaceutical compositions in the form of tablets in which the active pyrazole compound is replaced by a like quantity of the product of e.g. any one of Examples I to VII.

I claim:

1. As new compounds, nitropyrazole derivatives of the formula:

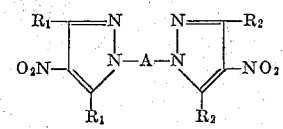

wherein $R_1$ and $R_2$ are members of the class consisting of hydrogen atoms and alkyl containing up to 4 carbon atoms, and A is a member of the class consisting of the straight chain saturated aliphatic hydrocarbon groups containing 1 to 12 carbon atoms, the but-2-ene chain, the 3-methyl-n-pentane chain, the hydroxy propane chain, the diethyl ether linkage, the succinyl linkage and the cyclohexane linkage.

2. As new compounds, nitropyrazole derivatives of the formula:

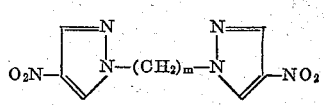

where $m$ is an integer from 2 to 7 inclusive.

3. 1,7-di-(4-nitropyrazol-1-yl)-n-heptane.

4. 1,5-di-(4-nitropyrazol-1-yl)-n-pentane.

No references cited.